United States Patent [19]

Tomita

[11] 4,198,776

[45] Apr. 22, 1980

[54] PORTABLE CONTAINER FOR FISH

[76] Inventor: Shuzo Tomita, 9-1-35 Kyoeicho, Ohbu-shi Aichi-ken, Japan

[21] Appl. No.: 875,457

[22] Filed: Feb. 6, 1978

[30] Foreign Application Priority Data

| Feb. 5, 1977 | [JP] | Japan | 52-11868 |
| May 20, 1977 | [JP] | Japan | 52-6545[U] |
| Jul. 28, 1977 | [JP] | Japan | 52-122504[U] |
| Sep. 11, 1977 | [JP] | Japan | 52-122504[U] |

[51] Int. Cl.² .................................. A01K 97/00
[52] U.S. Cl. ........................................... 43/56
[58] Field of Search ............... 43/54.5 R, 55, 56, 57; 261/121 M

[56] References Cited

U.S. PATENT DOCUMENTS

| 2,631,402 | 3/1953 | Lustofka | 43/55 |
| 2,706,870 | 4/1955 | Stogner | 261/121 M X |
| 2,761,239 | 9/1956 | Stamps | 43/56 |

*Primary Examiner*—Robert C. Watson

*Attorney, Agent, or Firm*—Armstrong, Nikaido, Marmelstein & Kubovcik

[57] ABSTRACT

A portable container for fish, in which a ventilating pipe is fitted into a setting hole provided in the top wall of an otherwise sealed container. The ventilating pipe includes top and bottom covers. The ventilating pipe is provided with a small vent at the center of the top cover and with a plurality of small induction holes in the bottom cover. Even if the container is momentarily inclined, the water in the container will not flow out straightly from the small induction holes in the bottom cover to the small vent in the top cover. The side wall of the container can be partially transparent and the top and bottom ends are of double reinforced construction. The setting hole for the ventilating pipe is provided with an annular neck which is of triple layer reinforced construction by turning a skirt back on itself. The container can be fitted into an insulating box, with the container matching the shape of the box, for maintaining the water inside the container at a low temperature.

3 Claims, 21 Drawing Figures

PORTABLE CONTAINER FOR FISH

BACKGROUND OF THE INVENTION

1. Field of the Invention

The present invention relates to a portable container suitable for keeping fish alive while being transported, and which is provided with a vent in the top wall.

2. Description of the Prior Art

Conventionally, portable containers for transporting young fish, shrimp and the like have utilized oxygen sealed above the water surface inside the container or oxygen or air mixed with oxygen which is airfoamed into the water inside the container by an air pump.

However, when keeping a container under a sealed condition for a long period of time the temperature inside the container gradually rises, which is undesirable for feeding fish, shrimp and the like; and further, this causes an increase in the pressure inside the container which cuases the fish, shrimp and the like to die from shock due to impact upon clashing. For this reason, a generally employed solution has involved providing an inlet on the top of the container which is connected to the air pump and an outlet for venting the air injection-foamed into the container as set forth above. Thus, the container is usually in an open state, so that when the container is momentarily inclined or goes up and down due to swing during transportation, the water inside the container tends to leak out from the air vent. This problem is particularly accute when carrying the container by hanging it from the shoulder as a shoulder bag with the user's clothes getting wet; and when carrying the container by car, the motion of the car causes the seats and the like to get wet. Further, since the walls of a conventional fish container are formed with a completely opaque body, the fish and the like accommodated in the container can not be directly watched, thus making the container unsuitable for use as an ornamental container. Moreover, because the top and bottom ends of the container are of single layer construction, there has been a problem in strength, particularly in winter when the wall surfaces formed of synthetic resin are damaged due to their hardened state.

SUMMARY OF THE INVENTION

An object of this invention is to provide a container for fish having a vent on the top, in which leakage of water due to swing and the like during transportation is avoided, thus removing a danger of wetting clothes, seats and the like by leakage of water.

Another object of this invention is to provide a container for fish according to the first object, in which a panoramic effect is brought forth by forming a part of the wall surface of the container with a transparent body and the upper and lower ends of the side wall is turned back on itself to form a double construction, and strength is given by fitting a reinforcing member thereinto, thus making it possible to use the device as an ornamental container.

Still another object of this invention is to provide a container for fish according to the first object, in which an annular neck is fitted into the setting hole for the ventilating pipe is of triple layer construction, thereby permitting the gripping force of the setting hole on the ventilating pipe to be increased and the manufacturing process to be simplified.

A further object of this invention is to provide a container for fish according to the first object, in which the container can be available as a refrigerator for food and drink on a trip, as well as being capable of extending the life of fish, by keeping the inside of the container at a low temperature.

More specifically, the present invention is directed to a portable container for fish, in which the water inside the container does not leak out therefrom due to swing and the like during transportation. Further, the invention is directed to a portable container for fish which can be used as an ornamental container having a securely fitted ventilating pipe or being capable of maintaining a low interior temperature. The ventilating pipe utilized in the portable container for fish according to the present invention is provided with a top wall or cover having a small vent hole at the center and a bottom wall having a plurality of small induction holes. In addition, the container is formed with a transparent body; an annular neck is fitted around the setting hole for the ventilating pipe and is formed of a triple layer reinforced construction; and the container may be located in an insulating box. As a result, compared with conventional containers for fish having a vent at the top, the container according to the present invention is free from water leakage, useable as an ornamental container and capable of extending the life of fish accommodated therein.

Other objects of this invention will be clear from the following specification and accompanying drawings, wherein:

DETAILED DESCRIPTION OF THE INVENTION

Several embodiments of the present invention will be described referring to accompanying drawings.

Figure 1:
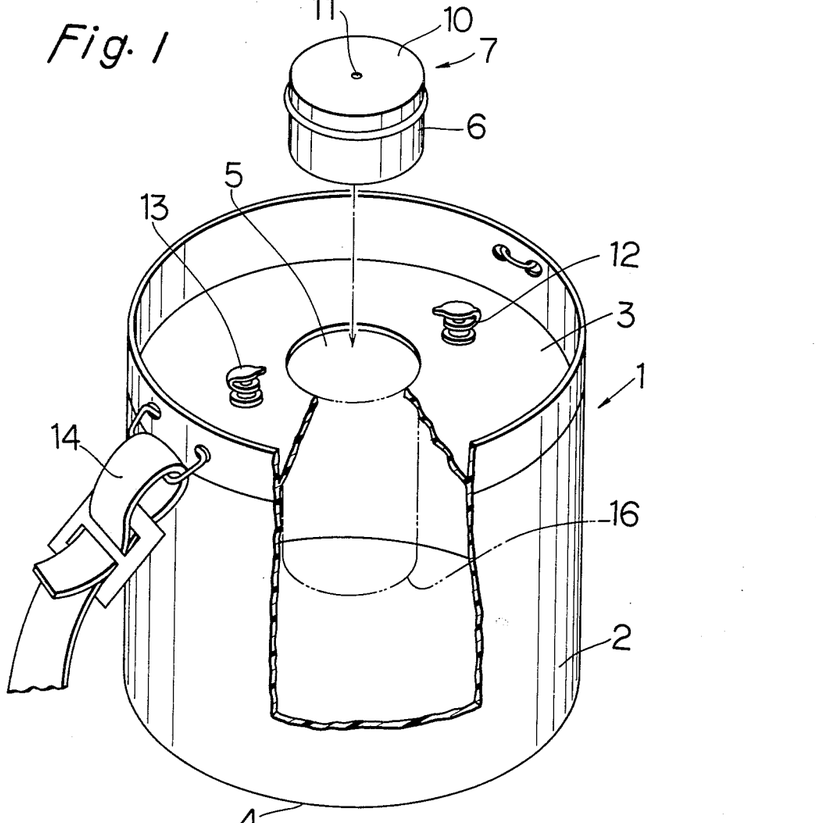
FIG. 1 is a partially cut away perspective view showing a first embodiment of the present invention.
Figure 2:
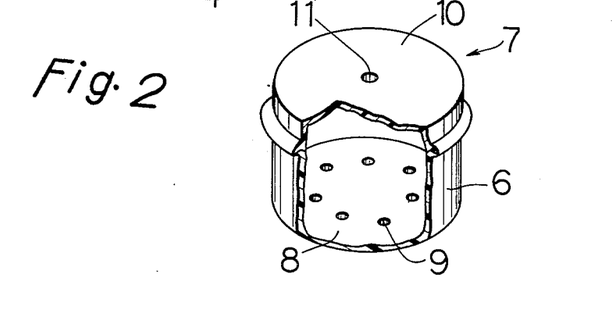
FIG. 2 is a partially cut away perspective view of the ventilating pipe employed in the present invention.

A first embodiment illustrated in FIG. 1 comprises a cylindrical portable container 1 for fish formed from a soft synthetic resin film, the transverse section of which is formed in an oval shape. A side wall 2 is hermetically integrated with a top wall 3 and a bottom wall 4, respectively. The top wall 3 is located at a level slightly below the upper edge of the side wall 2, and at the center thereof a circular setting hole 5 is formed. Into the setting hole 5, a ventilating pipe 7 made of synthetic resin, having an insert portion the outside diameter of which is formed to be identical with the inside diameter of the setting hole 5, is removably fitted. The ventilating pipe 7 forms an air-tight seal with the setting hole 5 so that water will not leak out therefrom. As illustrated in FIG. 2, the ventilating pipe 7 is in the form of a hollow cylindrical container having a bottom plate 8 provided with a plurality of small induction holes 9 formed near the outer circumference thereof, and a top or cover plate 10 provided with a single small vent 11 formed at the center thereof. The location of the setting hole 5 is not necessarily at the center of the top wall 3, nor are the induction holes 9 necessarily located at the outer circumference of the bottom plate 8. Further, the vent 11 is not necessarily located only one at the center of the upper wall 10, however, expecting every possible angle of inclination of the container 1, it is most desirable to form the setting hole 5, induction holes 9 and the vent 11 as set forth above. The cover plate 10 is removably fitted into an insert portion 6 so as to cover the upper edge of the insert portion 6. The induction holes 9 of the ventilating pipe 7 may be formed on the lower portion of the insert portion 6.

The cover plate 10 may be a screwed type without employing the construction freely fit with the inserting portion 6, or may be formed as an integrated construction with the insert portion 6. Alternatively, a cylinder 16 made of soft synthetic resin film may be continuously formed with the setting hole 5 as illustrated by broken-lines in FIG. 1.

The top wall 3 is further provide with a socket 12. The socket is arranged in parallel with the setting hole 5 and is located in the shorter axis direction of the oval. The socket 12 is designed to be freely opened or closed by a plug.

A socket 13 having a plug is provided in the top wall 3 which is identical with the socket 12. A belt 14 is provided for carrying the container on a user's shoulder. The ends of the belt 14 are connected near the upper end edge of the side wall 2.

Figure 3:
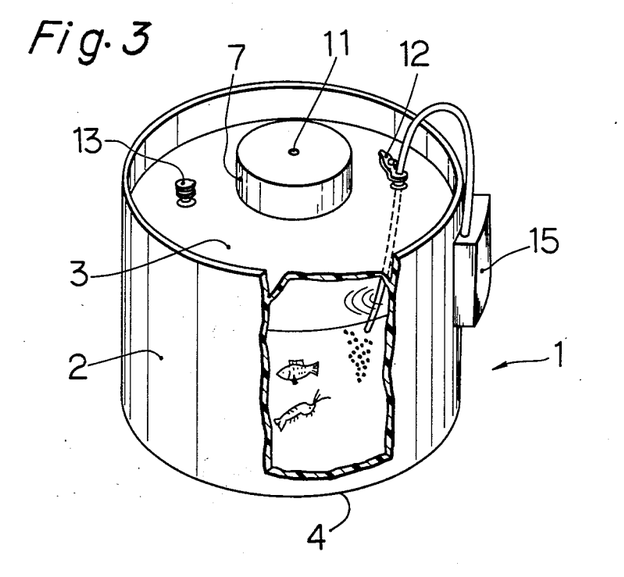
FIG. 3 is a partially cut away perspective view showing the first embodiment as it would appear when in use.

After injecting a prescribed amount of water into the container through the setting hole 5, live young fish, shrimp and the like are accommodated, for instance, as shown in FIG. 3, using a small air pump 15 for injecting air into the water in container 1, in order to keep the young fish, shrimp and the like alive during transportation to a fishing place by shouldering as a shoulder bag or carrying inside a car. During transportation the socket 13 is kept in a closed or plugged state.

When transporting the container 1 by shouldering or loading inside a car, the container may be inclined, subjected to impact or swung by external force of various kinds.

Figure 4:
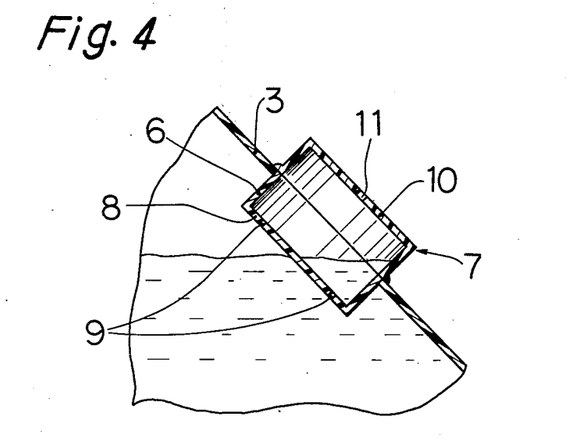
FIG. 4 is a sectional view illustrating the function of the ventilating pipe employed in the present invention.

When the container 1 is inclined by external force, one side of the top wall 3 drops to a downwardly inclined position and the other side of the wall remains above the water surface and communicates with open air through the vent 11 formed in the cover plate 10 of the ventilating pipe 7. For this reason, the inside of the container 1 is kept at atmospheric pressure and the flow of water running into the ventilating pipe 7 from the induction holes 9 is slowed down, thus bringing about a time lag before the water level inside the ventilating pipe 7 becomes identical with that of the inside of the container 1. Therefore, water will not leak out from the ventilating pipe 7 unless the container is almost turned over on its side.

Further, even when the water inside the container 1 spurts into the ventilating pipe 7 due to impact, the water does not spurt outside directly, thereby avoiding the leakage of water, because the vent 11 is formed only at the center of the cover plate 10 while the water spurts from the induction holes 9 formed near the outer circumference of the bottom plate 8. When the container is subject to up-and-down motion, although the water inside the container runs high and rushes into the ventilating pipe 7, the water will not leak out unless the inside of the ventilating pipe 7 is full of water.

That is, there is no danger of leakage of water due to inclination, swinging or momentary impact of the container generally expected during transportation. On the other hand, the water inside the ventilating pipe 7 returns to the container 1 from the induction holes 9 when the container is restored to the former upright state.

Figure 5:
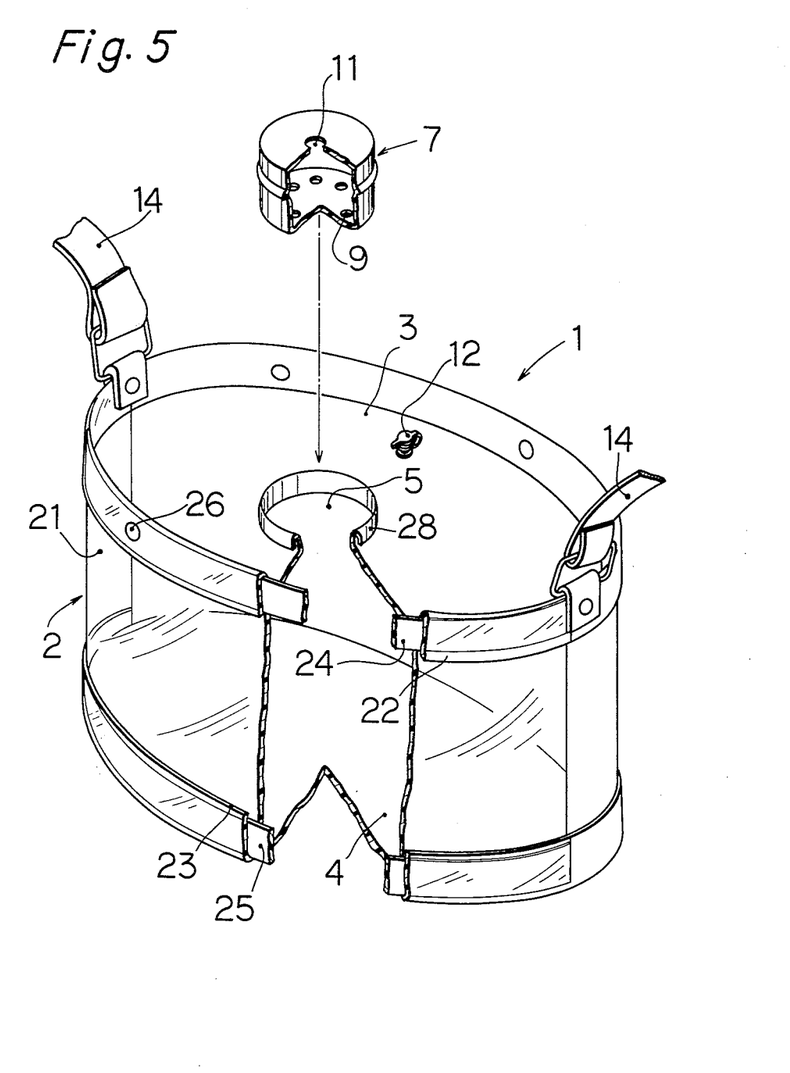
FIG. 5 is a partially cut out perspective view showing a second embodiment of the present invention.
Figure 6:
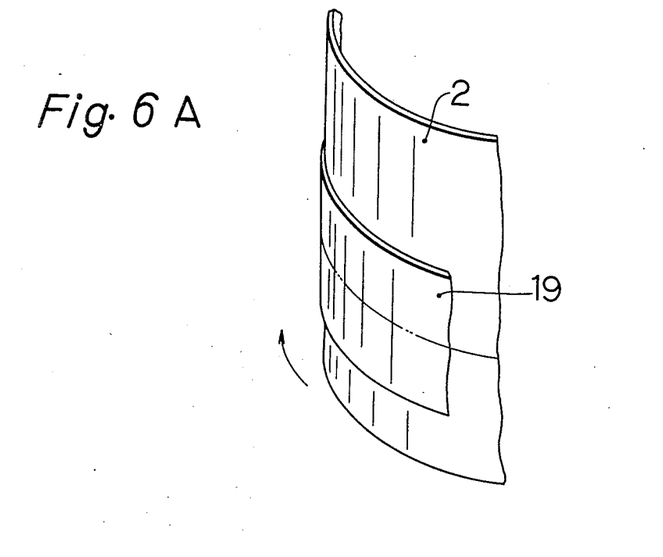
FIG. 6A is a perspective view of the bottom portion of the second embodiment in the process of being formed prior to the turning back thereof.
FIG. 6B is a perspective view of the bottom portion of the second embodiment in the forming process of being formed after the turning back thereof.

FIG. 5 illustrates a second embodiment of the invention comprising a container 1 made of soft synthetic resin similar to the first embodiment and having a transverse section which has an oval shape. A side wall 2 is hermetically connected with a top wall 3 and a bottom wall 4. About half of the side wall 2 is formed from a transparent material 21, and a frame 19 and the like is set to the upper and lower end edges of the wall by forming a double layered construction 22, 23 by turning back both edges outside respectively, and inserting reinforcing ring bands 24, 25. After securing the upper band 24 with screws and the like, the side wall 2 is hermetically melted with the transparent top wall 3 at a level slightly below the band 24 and with the opaque bottom wall 4 at the lower end edge, respectively. In the top wall 3, in the vicinity of the center, a setting hole 5 having an annular neck portion 28 is formed by turning back a cylindrical skirt 27 and, corresponding to the setting hole 5, a ventilating pipe 7 is provided which can be freely inserted and removed as necessary.

Figure 8:
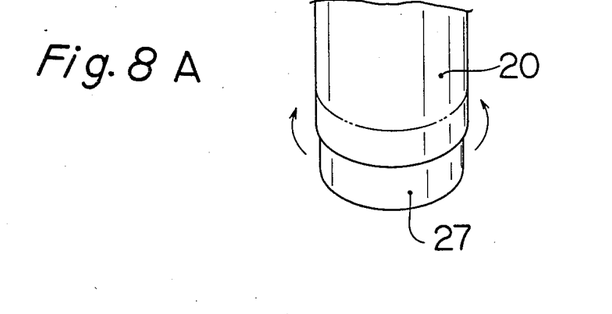
FIG. 8A is a partially perspective view showing the first step in the forming process of the annular neck fitted into the setting hole for the ventilating pipe utilized in the second embodiment of the present invention.
FIG. 8B is a partially perspective view showing the second step in the forming process of the annular neck.
FIG. 8C is a partially perspective view showing the final step in the forming process of the annular neck.

The forming process for the annular neck portion 28 of the setting hole 5 is as shown in FIGS. 8A, 8B and 8C.

After making a double layered construction by turning the lower end upward a prescribed measure setting a frame 20 (FIG. 8A), the skirt 27 is melted to the top wall 3 by means of high frequency welding and the like (FIG. 8B), then punched out along the inner circumference of the skirt, and manufactured by cutting a turning back portion 29 of the lower end as well as forming the setting hole 5 (FIG. 8C).

Figure 7:
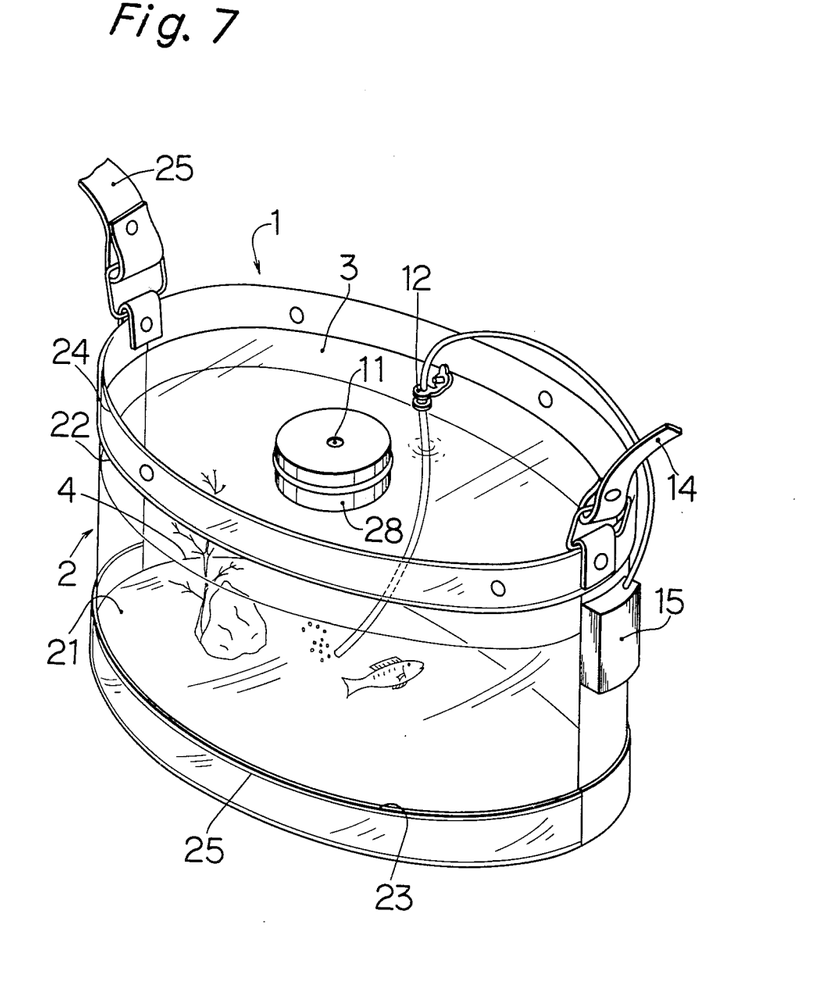
FIG. 7 is a perspective view showing an example of the second embodiment as it would appear when in use.

During transportation, the container is generally used with the ventilating pipe 7 inserted into the skirt 27 made in portion 28 of a double layered construction by turning back the upper end outside.

Although the second embodiment is similar to the first embodiment, it consists of using the container as an ornamental one with pebbles, duckweeds and the like placed therein.

The band 24 in the form of a ring is inserted into the top portion of the container 1 to reinforce the container, so that even if the wall surface made of synthetic resin is hardened by low temperatures particularly in winter, the container will not be damaged nor leak water therefrom, thus being available for use the year round. Since about half of the side wall 2 is formed with the transparent body 21, the container can serve an ornamental use as well, and young fish and the like accommmodated therein can be clearly watched from outside. Moreover, since about a remaining half of the side wall 2 and the bottom wall 4 are formed with an opaque body, young fish, shrimp and the like can be accommodated in such a state that the opaque portion of the wall becomes shelter for them, and since the transparent body and the opaque body face each other, lens action works on mediating water as well as increasing the temperature due to lens action and direct sunlight can be avoided.

The container can be modified in several ways within the contemplation of the present invention. For example, the upper and lower bands may be connected by a narrow band strip, or when forming the side wall, bands may be integrally enclosed in the upper and lower ends thereof, and if a picture and the like is enclosed in a part of the side wall, the panoramic effect will be improved.

In the second embodiment, in order to avoid leakage of water, the annular neck and the ventilating pipe 7 must be close together; however, the neck fitted into portion 27 is made from soft material such as vinyl chloride resin containing plastics, and especially in summer, this portion becomes softer and therefore the tightening force drops accordingly, so that it is difficult to maintain the required close or tight contacting state. Further, the turned back portion 29 of the skirt 27 must be cut and removed each time, which is troublesome in manufacturing.

Figure 10:
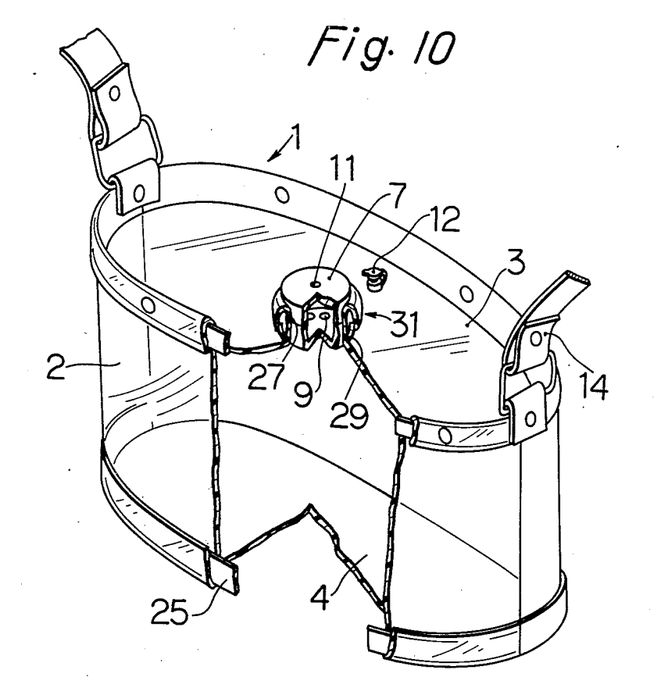
FIG. 10 is a partially cut away perspective view showing the third embodiment of the present invention.
Figure 11:
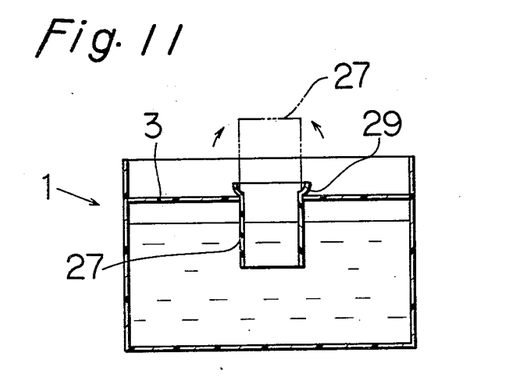
FIG. 11 is a diagrammatic sectional view showing the function of the annular neck utilized in the third embodiment.

In the third embodiment illustrated in FIGS. 10 and 11, the turned back portion of the lower end in the second embodiment is formed with the turned back portion left as it is without cutting, i.e., a container for fish having an annular neck fitted which is of a triple construction is provided.

Figure 9:
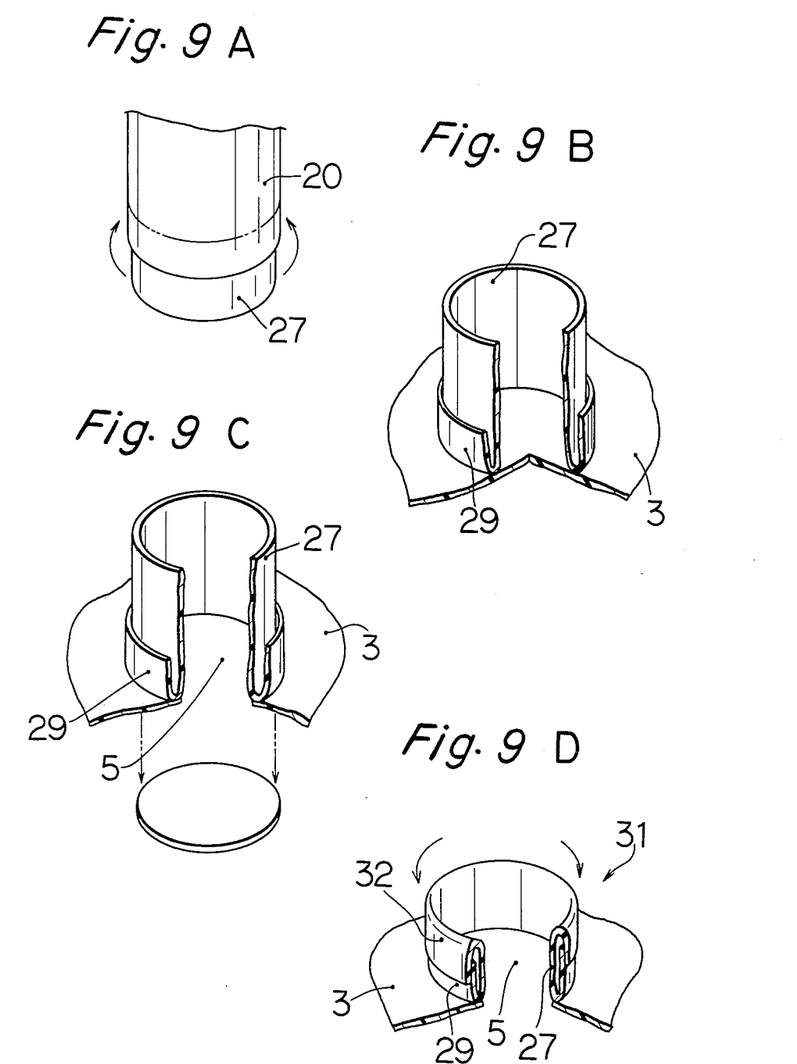
FIG. 9A is a partially perspective view showing the first step in the forming process of the annular neck fitted into the setting hole for the ventilating pipe utilized in a third embodiment of the present invention.
FIG. 9B is a partially perspective view showing the second step in the process of forming the annular neck.
FIG. 9C is a partially perspective view showing the third step in the process of forming the annular neck.
FIG. 9D is a partially perspective view showing the final step in the process of forming the annular neck.

As illustrated in FIG. 10, the container has the skirt 27 turned back upwardly a prescribed distance at the lower end, and then the upper end turned back outwardly so as to cover the turned back portion 29 of the lower end to form a neck portion 31 of a triple construction, into which the ventilating pipe 7 made of synthetic resin is fitted. The annular neck portion 31 is formed as follows:

The frame 20 is set to the skirt 27 and the lower end of the skirt is turned back upwardly a prescribed distance (FIG. 9A); the skirt is pressed to the top wall 3 of the container 1 with the frame 20 and is melted and secured by means of high frequency welding and the like (FIG. 9B); the inner circumference of the skirt 27, forming the setting hole 5 by punching with a punch press and the like (FIG. 9C); the upper end is turned back outwardly so as to cover the turned back portion 29 of the lower end (FIG. 9D). Wherein, since the skirt 27 is pressed to the top wall 3 with the frame 20, it is melted to the top wall 3 as much as the thickness of the frame 20 (about 3 mm). Into this annular neck portion of triple construction, the ventilating pipe 7 is inserted.

In this embodiment, it is not necessary to cut and remove the turned back portion 29 of the lower end and therefore the manufacturing process can be simplified. And, since the annular neck portion 31 for receiving the ventilating pipe 7 is of triple layer construction with the upper and lower ends of the cylindrical skirt 27 turned back outside, the outer layer is stronger thus permitting an increased tightening or gripping force with the outer circumference of the ventilating pipe 7. That is, the skirt 27 is a cylinder having an approximately equal diameter at any portion, so that when turning back the end portion, the outer the layer goes, the longer the end has to be turned back with it drawn and the turned back portion 32 of the outer layer puts pressure on the inside of the annular neck portion 31 with its restorative power. When the tightening force becomes weak due to softening by hot weather and the like, insertion of a member such as paper into the neck portion 31 can strengthen the tightening force.

Moreover, after removing the ventilating pipe 7, extending the skirt 27 as a pipe form by turning the turned back portion of the outer layer inside 90 degree as shown by a dot-dash-line in FIG. 11 and then turn downward 180 degree so that the top end be located at a prescribed height from the bottom wall 4, and oxygen can be sealed between the top wall 3 and the water surface.

Many modifications are possible, e.g., if half of the side and the top are formed with a transparent body, the container can be utilized for ornamental use as well, and since the ventilating pipe 7 is fitted into the setting hole 5, the container can be utilized as a container for insect collecting, botany and the like.

Figure 12:
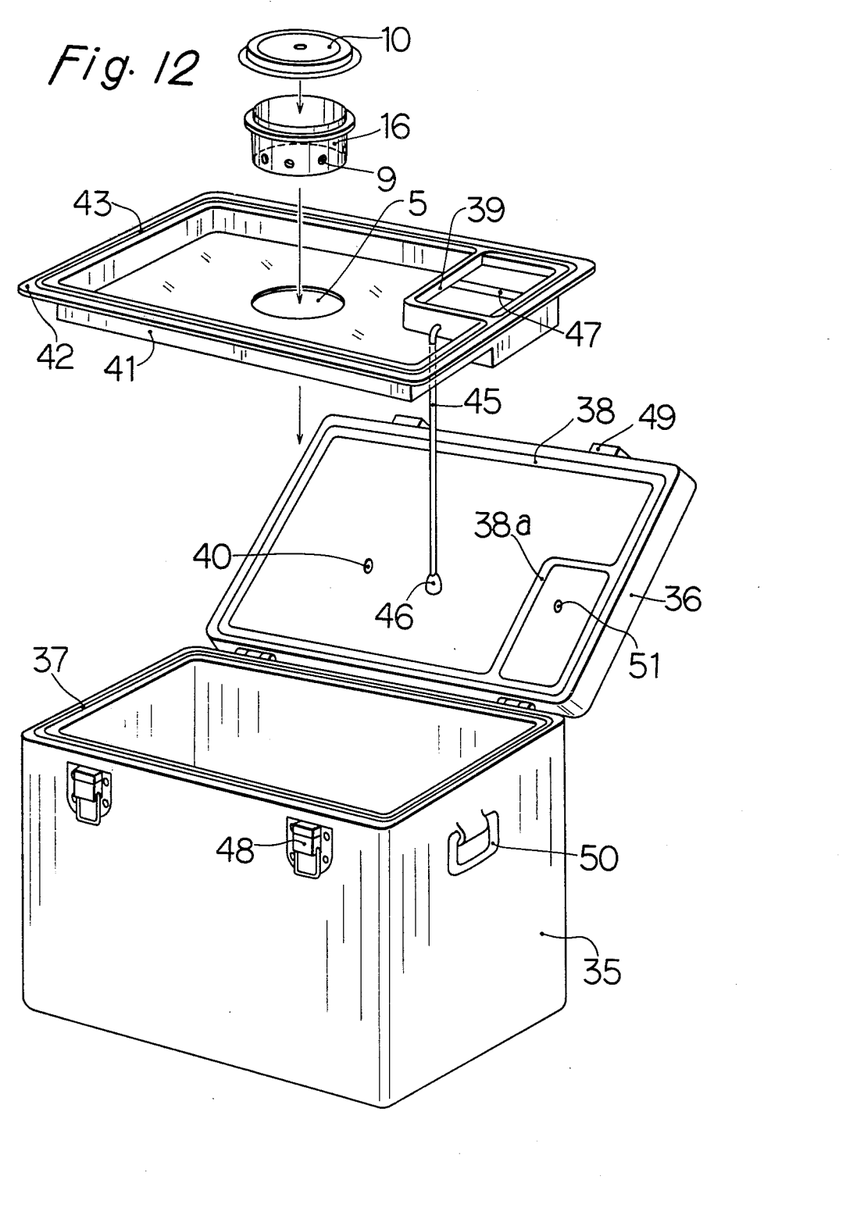
FIG. 12 is an exploded perspective view showing a fourth embodiment of the present invention.
Figure 13:
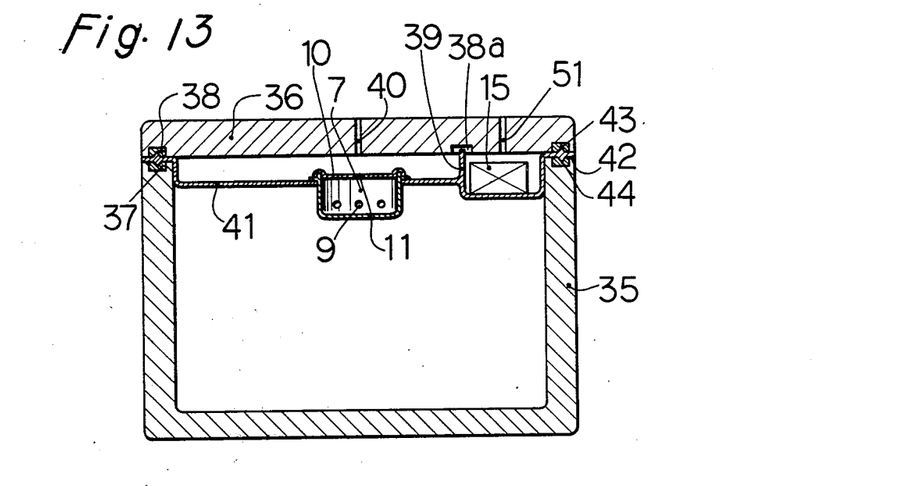
FIG. 13 is an assembled sectional view of the fourth embodiment of the present invention.

The fourth embodiment illustrated in FIGS. 12 and 13 consists of a container for fish formed with insulating material, whereby the temperature of the water inside the container can be kept low.

In FIGS. 12 and 13, a container 35 and a cover 36 are both rectangular box form containers formed so as to cover the surface of insulating material inside with synthetic resin plate and are connected with each other by hinges. In the vicinity of the center of the upper end edge of the container a rubber packing 37 is embedded and a corresponding rubber packing 38 is embedded into the circumference on the back of the cover 36 and a rubber packing 38a is integrally formed with the packing 38 embedded. The packing 38a is formed so as to surround one corner of the packing 38 to correspond to an air pump housing 39 described later on, on which a vent 51 is bored so as to communicate with the outside and also on the outside of this surrounding a vent 40 is bored. A middle cover 41 is provided in the form of a shallow tray, on the top end of which a flange 42 is provided, on both the upper and lower sides of the flange 42, projecting lines 43 and 44 are formed corresponding to the packings 38 and 37, respectively. The housing 39 for the air pump 15 is provided with a bottom side which is formed to be deeper than the other portions, and the top edge of which is the same height as the projecting line 43 and formed to be continuous therewith. The air pump is driven by a built-in battery and can also be connected to the power supply of the car. The suction inlet to the air pump 15 is bored in the housing 39, and the discharge outlet from the pump is communicated to an air stone 46 secured at the tip of a flexible tube 45 and formed to discharge air as small air foam from the air stone 46. A belt 47 is provided for securing the air pump 15 in the housing 38. Into the setting hole 5 bored in the bottom of the middle cover 41, the ventilating pipe 7 is slidingly and air tightly inserted as in the other embodiments. As illustrated in FIG. 13, the middle cover 41 is fit to the container 35, the cover 36 is closed, buckles 48, 49 are fastened, and the projection lines 43, 44 and the upper edge of the housing 39 press on the packings 37, 38 and 38a and seal the housing 39 independently as well as the container. A handle 50 is provided for transportation.

On starting for fishing, food and drink, bait and the like are placed in the container 35, ice is placed directly on them or pieces of ice are held in the ventilating pipe 7, the cover 36 is shut with the air pump 15 turned off, the buckles 48, 49 are fastened and the container is loaded in the car. After arriving at a fishing place and taking out the food and drink, water is poured into the container to a prescribed level leaving a gap between the water level and the bottom of the ventilating pipe 7 and the air pump 15 is then turned on. When traveling on foot for fishing, the air pump 15 is operated from the built-in battery. The air pump 15 takes in air from a vent 51 and discharges it as small air foam from the air stone 46 through the flexible tube 45. The air foam floats up on the water surface and is released outside through the ventilating pipe 7 and the vent 40. Therefore, the water inside the container is supplied with oxygen as well as kept at a low temperature by the ice. When admitting fish into the container, it is desirable to admit fish from the setting hole 5 after removing the ventilating pipe 7 so as to avoid an increase in temperature inside the container. When loaded in the car for a long period of time, such as on the way back after fishing, the air pump may be driven by power supplied by the car.

Figure 14:
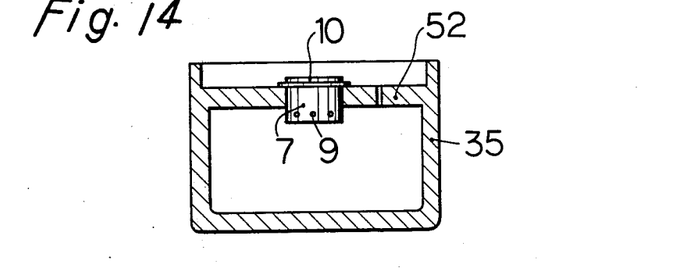
FIG. 14 is a sectional view showing a modified example of the fourth embodiment.
Figure 15:
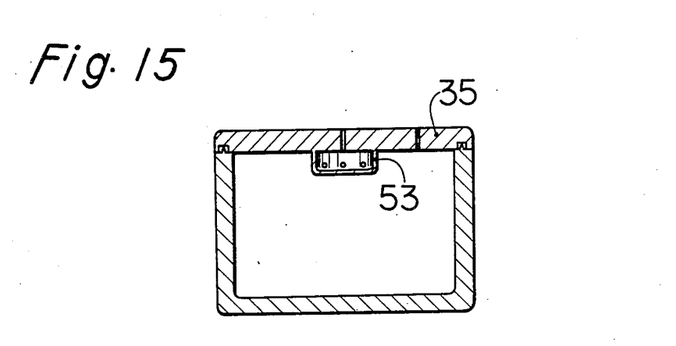
FIG. 15 is a sectional view showing still another modified example of the fourth embodiment.

Moreover, in the present invention, the vent 51 for taking in air may be bored in the side instead of in the cover, and when using an oxygen cylinder instead of the air pump 15, the hose of the oxygen cylinder may be inserted into the vent 15 with the air pump 15 turned off. Further, as shown in FIG. 14, the cover 36 in the preceding example may be omitted and a portion corresponding to the middle cover 41 may be secured to the container 35 as a cover 52 formed of insulating material and the ventilating pipe 7 may be set into the cover 52; or as illustrated in FIG. 15, on the back of the cover 36 a ventilating pipe portion 53 corresponding to the ventilating pipe may be integrally and securely constructed. In these embodiments, the air pump may be set in accordance with the preceding embodiment or on the outside.

While various embodiments of the present invention have been illustrated, however, it is to be understood that various modifications may be made without departing from the spirit and scope of the invention defined in the accompanying claims.

As will be seen from the foregoing description, the present invention is effective as follows:

(a) Even when the container inclines, swings, or is subject to impact, leakage of liquid such as water can be avoided, and getting clothes or seats of the car wet due to leakage during transportation can be avoided.

(b) When injecting oxygen or air with it air foamed by means of the air pump, the container is in communication with the atmosphere, so that the inside of the container can be usually kept at atmospheric pressure and the fish accommodated therein kept alive for a long period of time.

(c) In the container for fish in the second embodiment, it can be strengthened and the durability improved, and not only used for transportation but also for ornamental use which provides panoramic effect that young fish, shrimp and the like can be watched, and in the dry state, since the small container provided on the top wall has the vent, the container can be used for insect collecting and the like. Also, the bands fitted into the upper and lower ends can provide a design effect.

(d) In the container in the third embodiment, wherein the annular neck portion becomes a triple layered constrution, the manufacturing process can be simplified, the tightening force strengthened, the relation between the outer circumference of the small container therewith kept in a close state, and compared with the fitted portion of the conventional double construction, durability can be improved. Further, even if the tightening force drops due to heat-softening, a member such as paper can be inserted thereinto to keep the tightening or gripping constant; and further, a measure regulating member such as a ring can be inserted, the annular neck portion would be stronger, and the tightening could be much strengthened by the insertion of an elastic body.

(e) In the fourth embodiment, since the container is formed from insulating material, it can serve as a refrigerator through the use of ice, thus being available for refrigerating food and drink during travel. As a container for fish, it can keep water at a low temperature, so that the life span of the fish is increased. The top of the container in itself is communicated with the atmosphere through only the vent of the ventilating pipe, so that even if too much water is admitted into the container, the water does not flow out due to inclination and swing, and wave motion is small. Therefore, the container is suitable for loading in a car and the like and it has been proved by actual results that smelts transported by the container for five to eight hours after fishing were living more than a week after being released in a pond. This demonstrates the fact that the function of the container according to this invention has been remarkably improved compared with ordinary containers for fish. This is very effective in the point that fresh-water fish, wherein freshness drops rapidly after death, can be transported as far as to one's home while keeping the fish alive.

What I claim is:

1. A portable container for transporting live fish comprising:
   a top wall;
   a bottom wall;
   a side wall interconnecting said top and bottom walls to form a sealed container;
   a setting opening formed in said top wall communicating with the interior of said sealed container;

a vertically positioned cylindrical ventilating pipe adapted to be inserted in sealing engagement in said setting opening formed in said top wall, said ventilating pipe being comprised of a cover plate closing an upper end of said cylindrical ventilating pipe and a bottom plate closing a lower end of said cylindrical ventilating pipe, said cover plate including a single, small centrally positioned vent opening and said bottom plate including a plurality of small induction holes, wherein a part of said sealed container is transparent, and the upper and lower ends of said side wall are turned back to form a double construction into which a reinforcing member is inserted.

2. A portable container for fish according to claim 1, further comprising an annular neck portion surrounding said setting opening, said annular neck portion being formed with a triple wall construction that is mounted to said top wall along the outer circumference of said setting opening, said triple wall construction being comprised of a turned back portion formed by turning back a lower end of a cylindrical skirt the outside of which is melted, and to the circumference of said turned back portion a second turned back portion is formed by turning back an upper end of the skirt, the two turned back portions being closed together.

3. A portable container for fish according to claim 1, further comprising an annular neck portion surrounding said setting opening, said annular neck portion being formed with a triple wall construction that is mounted to said top wall along the outer circumference of a setting opening, said triple wall construction being comprised of a turned back portion formed by turning back a lower end of a cylindrical skirt the outside of which is melted, and to the outer circumference of said turned back portion a second turned back portion is formed by turning back an upper end of the skirt, the two turned back portions being closed together.

* * * * *